US007561934B2

(12) United States Patent
Terada et al.

(10) Patent No.: US 7,561,934 B2
(45) Date of Patent: Jul. 14, 2009

(54) AUDIO SIGNAL PROCESSING DEVICE

(75) Inventors: Kotaro Terada, Hamamatsu (JP); Mitsuhiko Ota, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 686 days.

(21) Appl. No.: 10/796,544

(22) Filed: Mar. 8, 2004

(65) Prior Publication Data

US 2004/0179695 A1 Sep. 16, 2004

(30) Foreign Application Priority Data

Mar. 10, 2003 (JP) ............................ 2003-064096

(51) Int. Cl.
*G06F 17/00* (2006.01)
*G06F 3/00* (2006.01)
*H04B 1/00* (2006.01)

(52) U.S. Cl. ........................................ 700/94; 715/716

(58) Field of Classification Search ................. 381/119; 715/700, 716; 700/94
See application file for complete search history.

(56) References Cited

U.S. PATENT DOCUMENTS

| | | | | |
|---|---|---|---|---|
| 4,291,604 | A | 9/1981 | Scott | |
| 4,479,240 | A | 10/1984 | McKinley, Jr. | |
| 5,243,513 | A | 9/1993 | Peters | |
| 5,402,501 | A * | 3/1995 | Silfvajt et al. | 381/119 |
| 5,959,610 | A * | 9/1999 | Silfvast | 345/156 |
| 6,438,241 | B1 * | 8/2002 | Silfvast et al. | 381/119 |
| 2002/0156547 | A1 | 10/2002 | Suyama et al. | |

FOREIGN PATENT DOCUMENTS

| | | |
|---|---|---|
| EP | 0 251 646 | 1/1988 |
| WO | WO 91/18456 | 11/1991 |

OTHER PUBLICATIONS

Roland Corporation, "VS-2480 24 bit/24 track Digital Studio Workstation", 2001, Roland Corporation, pp. 1-19 and 325-338.*

* cited by examiner

*Primary Examiner*—Curtis Kuntz
*Assistant Examiner*—Daniel R Sellers
(74) *Attorney, Agent, or Firm*—Morrison & Foerster LLP

(57) ABSTRACT

In an audio signal processing device which processes audio signals and outputs the audio signals, setting controls, such as filter controls, for setting values of parameters for the signal processing and a display for presenting information by the presence or absence and the style of lighting of LEDs is provided, in which when scene data stored in a scene memory is loaded, the display style of the display is made different in accordance with match/mismatch between a current set value of the parameter and the value of the parameter relating to the loaded scene data. Alternatively, the display is made to simultaneously present the loaded value and the value at the time of the loading in different display styles.

4 Claims, 8 Drawing Sheets

AUDIO SIGNAL PROCESSING DEVICE

BACKGROUND OF THE INVENTION

1. Field of the Invention

The present invention relates to an audio signal processing device which processes audio signals and outputs the audio signals and, more particularly, to an audio signal processing device characterized by control of display on a display portion. Further, the invention relates to a program for making a computer controlling the audio signal processing device perform such a control.

2. Description of the Related Art

Conventionally, in an audio signal processing device such as a digital mixer which processes audio signals and outputs the audio signals, indicators have been provided near corresponding setting controls for setting values of parameters for the signal processing to display the values of the parameters set by the controls (see U.S. 2002/0156547 A1, particularly FIG. 8 of the drawings and section 0061 in the description).

As the aforementioned indicator, an indicator is used that presents information by presence or absence of lighting of a light source such as an LED (light emitting diode). For example, for a digital mixer described in above described document, it is described that many LEDs are arranged around a dial-type control and used as indicators indicating a value set by the control. In this case, when the value of the parameter is changed by operation of the control, the LEDs are turned on or turned off to indicate a new value after the change.

Further, there is also a known mixer that is provided with a function of storing a set of values of parameters used for the signal processing as scene data and recalling this in accordance with operation of an operator. Also in performance of such a recall, the values of the parameters might be changed from the values before the recall, and therefore when the values are changed, the LEDs are turned on or turned off to indicate new values after the change.

There are conceivable use environments of the digital mixer including not only a bright place such as the outdoors during the daylight hours but also a dark place such as the inside of a concert hall with the illumination turned off. Even in such a dark place, the set contents of the parameter can be optically easily grasped by providing the aforementioned indicators implemented by the LEDs.

However, the display portion in such a conventional digital mixer simply displays the set value of the parameter at the time of performing display. This configuration presents no particular problem when the display is performed in accordance with the change in the value of the parameter by the operation using the control. This is because the operator of course grasps what parameter he or she changed, and the changes are performed step by step in this case, so that the operator can easily grasp how the parameter was changed as a whole as well as the current value.

However, there has been a problem at the time when many settings are changed in an instant such as when the scene data is recalled. More specifically, in such a case, the values of the parameters before the recall will be displayed before the recall and the values of the parameters relating to the recalled scene data will be displayed after the recall, but there has been a problem that it is difficult for the operator to grasp, even taking a look at the display after the recall, how and what parameters were changed by the recall of the scene data. Although it is possible to have some grasp by comparison between the displays before and after the recall, typically the controls are considerably large in number in the digital mixer, and therefore it is considerably difficult to grasp the presence or absence and the degree of change and memorize all of them at the instant of the recall.

To solve the aforementioned problems, there is also a known digital mixer including a function of changing only the display to that based on the scene data before the recalled scene data is reflected in the signal processing so as to be able to verify in advance the values of the parameters relating to the scene data. In the case of a device including such a function, it is possible to verify, before the actual change of the contents of the signal processing, to what values the values of the parameters will be changed, thus reducing the risk of recalling wrong scene data and performing wrong signal processing. Besides, several times changes and comparisons between the display of the currently set values of the parameters and the display of the values of the parameters relating to the scene data make it possible for the operator to have some grasp how the parameters will be changed by the recall of the scene data. The operation, however, is troublesome and time consuming and, in addition, once the scene data is reflected in the signal processing, the operator needs to remember the changed parts.

In an actual use of the digital mixer, it has been often performed that a plurality of scene data with the values of only a part among many parameters being changed are created and recalled in sequence for use, and there has been a strong demand to grasp where the values of the parameters relating to the recalled scene data are different from the values set before the recall, but the conventional digital mixers could not sufficiently meet the demand as described above.

SUMMARY OF THE INVENTION

It is an object of the present invention to solve the above-described problems and to configure an audio signal processing device which processes audio signals and outputs the audio signals such that when a value of a parameter stored therein is loaded, part of the value of the parameter changed from the value at the time of the loading and part thereof not changed can be easily distinguished.

To attain this object, the invention is an audio signal processing device which processes audio signals and outputs the audio signals which comprises: controls for setting values of parameters of the signal processing; a display for presenting a set value of the parameter; a memory for storing a value of the parameter; a loader for loading the value of the parameter stored in the memory; a comparator for comparing, when the loader loads the value of the parameter, a value of the parameter set at a time of the loading with the loaded value of the parameter; and a display controller for making a display style on the display different in accordance with a comparison result on match/mismatch by the comparator.

Further, the invention is an audio signal processing device which processes audio signals and outputs the audio signals which comprises: controls for setting values of parameters of the signal processing; a display for presenting a set value of the parameter; a memory for storing a value of the parameter; a loader for loading the value of the parameter stored in the memory; and a display controller for making, when the loader loads the value of the parameter, the display simultaneously present the loaded value of the parameter and a value of the parameter set at a time of the loading in different display styles.

In such an audio signal processing device, it is preferable that the display is provided with a light source capable of lighting up in a plurality of styles. Further, it is preferable that the light source is a light emitting diode. Further, it is preferable that lighting brightness of the light source is different for each of the display styles. Furthermore, it is preferable that the display is made to present the value of the parameter set at the time of the loading at a lower brightness than the loaded value of the parameter.

Alternatively, it is preferable that lighting color of the light source is different for each of the display styles.

It is also preferable that the display is a display for presenting continuous values. In this case, it is preferable that the display is made to present an overlapped part and a different part between the value of the parameter set at the time of the loading and the loaded value of the parameter in different display styles. Further, it is preferable that the display is made to present the overlapped part and the different part using a first display style and a second display style that is less conspicuous than the first display style.

Furthermore, it is preferable that when the loaded value of the parameter is larger than the value of the parameter set at the time of the loading, the display is made to present the overlapped part in the second display style and the different part in the first display style. Alternatively, it is preferable that when the loaded value of the parameter is smaller than the value of the parameter set at the time of the loading, the display is made to present the overlapped part in the first display style and the different part in the second display style.

Further, it is preferable that the above-described audio signal processing device further comprises an instructor for providing an instruction not to reflect the value of the parameter loaded by the loader in the signal processing, in which when the instruction has been provided by the instructor at the time of the loading of the value of the parameter, the loaded value of the parameter is not reflected in the signal processing.

Further, the invention is a computer program containing program instructions executable by a computer and causing the computer to execute: a process of processing audio signals and outputting the audio signals; a process of setting values of parameters of the signal processing in accordance with operation of controls; a process of making a display present a set value of the parameter; a process of storing a value of the parameter; a process of loading the value of the parameter stored in the storing; a process of comparing, when loading the value of the parameter in the loading, a value of the parameter set at a time of the loading with the loaded value of the parameter; and a process of making a display style on the display different in accordance with a comparison result on match/mismatch by the comparing.

Further, the invention is a computer program containing program instructions executable by a computer and causing the computer to execute: a process of processing audio signals and outputting the audio signals; a process of setting values of parameters of the signal processing in accordance with operation of controls; a process of making a display present a set value of the parameter; a process of storing a value of the parameter; a process of loading the value of the parameter stored in the storing; and a process of making, when loading the value of the parameter in the loading, the display simultaneously present the loaded value of the parameter and a value of the parameter set at a time of the loading in different styles.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be described with reference to the drawings.

Figure 2:
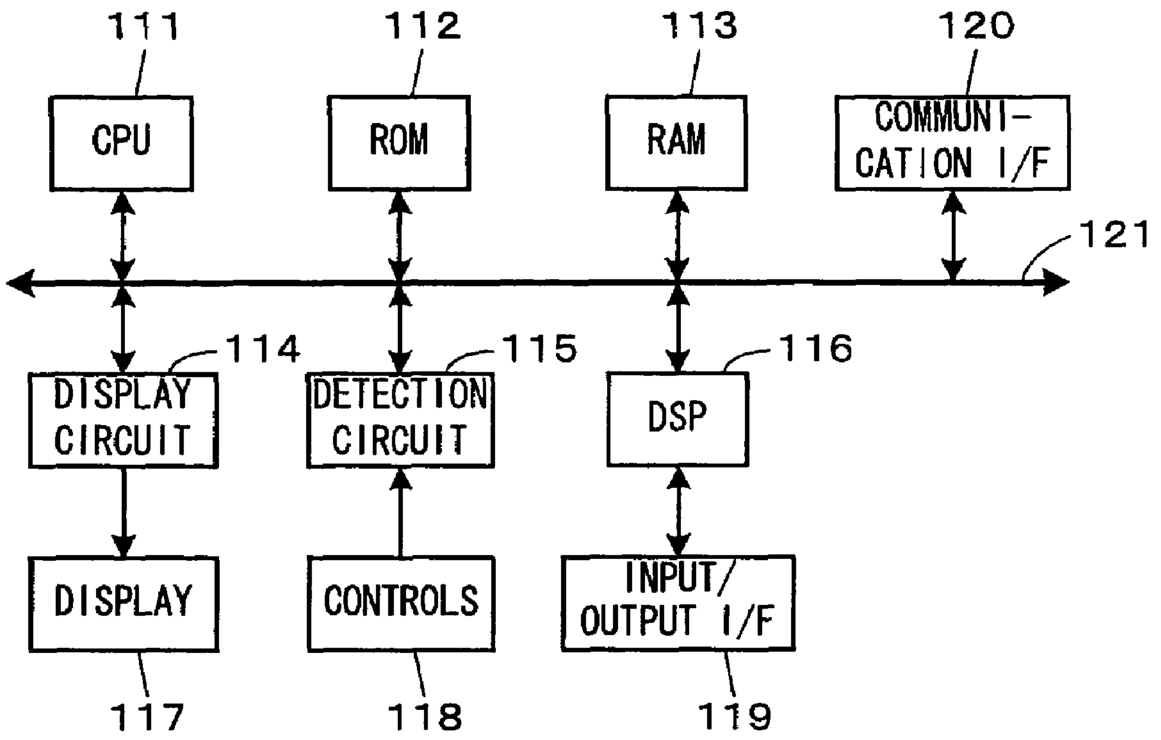
FIG. 2 is a block diagram showing a configuration of the digital mixer.

A configuration of a digital mixer being an embodiment of an audio signal processing device according to the invention will be described first. FIG. 2 is a block diagram showing the configuration of the digital mixer.

The digital mixer (hereafter, also referred to simply as a “mixer”) is an audio signal processing device which performs various kinds of signal processing such as mixing, equalizing, and so on for inputted audio signals in accordance with set parameters and outputs the audio signals, in which, as shown in FIG. 2, a CPU 111, a ROM 112, a RAM 113, a display circuit 114, a detection circuit 115, a digital signal processor (DSP) 116, and a communication interface (I/F) 120 are connected to a system bus 121. Further, a display 117, controls 118, and an input/output I/F 119 are connected to the display circuit 114, detection circuit 115, DSP116, respectively.

The CPU 111 is a control unit that comprehensively controls operation of the whole mixer and also executes a predetermined program stored in the ROM 112 to thereby control read and write of data in the ROM 112 and RAM 113, display on the display 117 by the display circuit 114, detection of operation at the controls 118 by the detection circuit 115 and change of values of parameters accompanying the change, signal processing in the DSP 116, communication with external devices via the communication I/F 120, and so on.

The ROM 112 is a non-volatile memory that stores a control program executed by the CPU 111, and so on.

The RAM 113 is a memory that includes a later-described setting buffer and verification buffer provided therein to store temporarily necessary data such as values of parameters set in the mixer and is used as a work memory of the CPU 111. Further, a part of the RAM 113 is a rewritable non-volatile memory such as an EEPROM, in which a later-described scene memory is provided to store scene data.

The display circuit 114 is a circuit that controls display on the display 117 based on control data sent from the CPU 111. The configuration of the display 117 will be described later in detail.

The detection circuit 115 is a circuit that detects operation in the controls 118 based on the control by the CPU 111. The configuration of the controls 118 will be described later; the display 117 and the controls 118 can be configured as an integral console panel.

The DSP 116 is a circuit that performs various kinds of signal processing including mixing and equalizing according to set values of various parameters for audio signals inputted through the input/output I/F 119, and the input/output I/F 119 is an interface for receiving input of audio signals to be processed in the DSP 116 and outputting the processed audio signals.

The communication I/F 120 is an interface for communicating with an external device such as a personal computer (PC). Further, the mixer can output the audio signals that have been processed by the DSP 116 to the external device, operate in accordance with control by the external device, and download programs from the external device to make the CPU 111 execute the programs.

A configuration of a console in which the display 117 and controls 118 of the digital mixer are arranged will be described next. A configuration example of the console is shown in FIG. 1, in which the configuration is simplified so that only characteristic parts are shown for convenience of illustration, and actually much more controls and display portions are often arranged.

Figure 1:
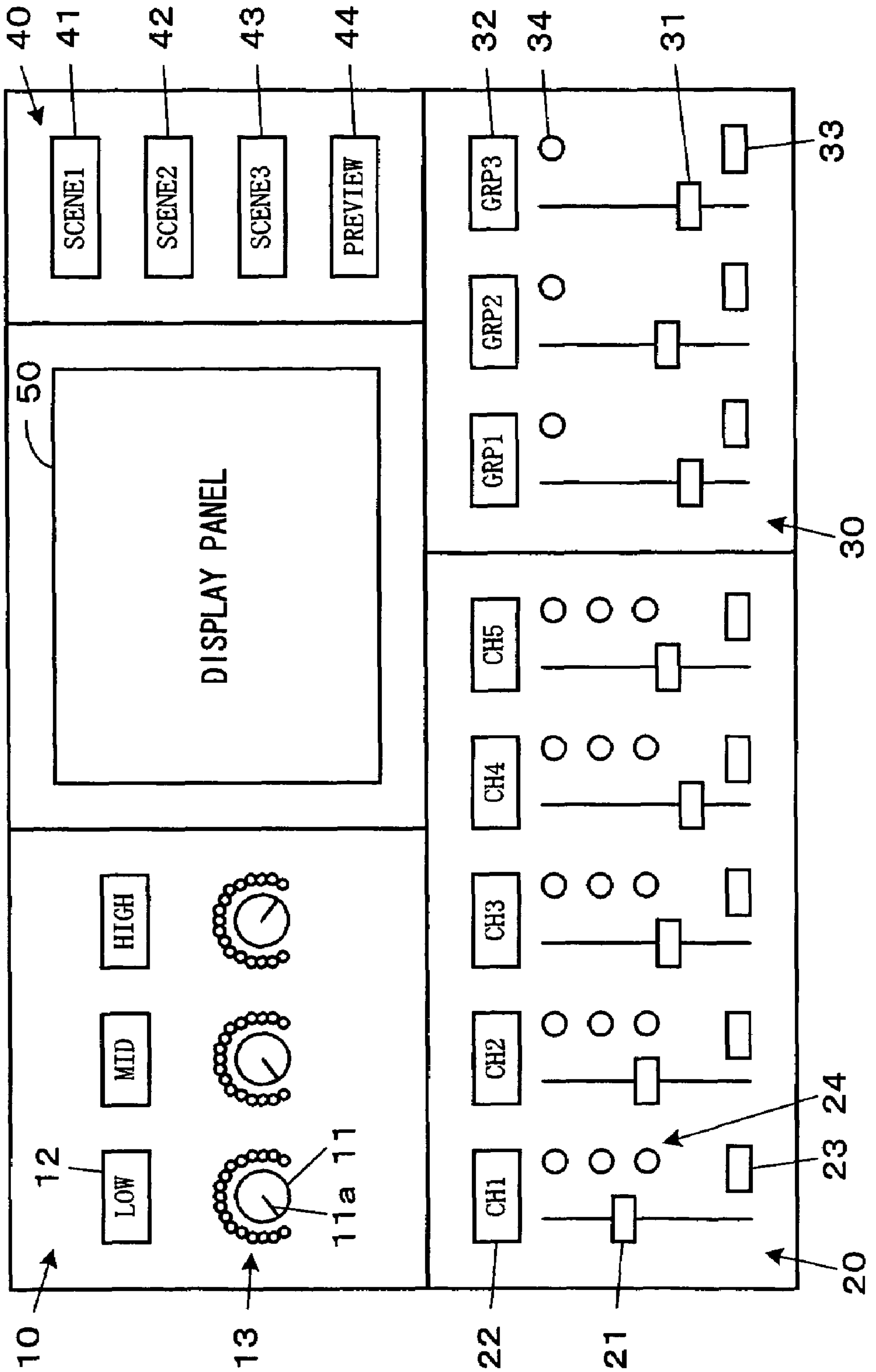
FIG. 1 is a view showing a configuration example of a console of a digital mixer being an embodiment of an audio signal processing device of the invention.

This console includes, as shown in FIG. 1, a filter operation section 10, a fader operation section 20, a group operation section 30, a scene recall operation section 40, and a display panel 50.

Further, the filter operation section 10 includes filter controls 11, filter range indicators 12, and filter value display portions 13. FIG. 1 shows an example in which three sets of these components are provided.

The filter control 11 is a dial-type setting control for setting a parameter of the output level of each frequency range by turning to the right with a minimum value at a position of a pointer 11*a* corresponding to LOW in FIG. 1 and a maximum value at a position of a pointer corresponding to HIGH.

The filter range indicator 12 is an indicator including a liquid crystal display (LCD), for displaying a frequency range for which the setting of the filter is performed by the filter control 11. For example, the filter range indicator 12 on the most left side in FIG. 1 shows that the corresponding filter control 11 is a control for setting the output level of a low frequency range.

The filter value display portion 13 is a display portion including a light source constituted of an LED capable of lighting-up at a first brightness and a second brightness lower than the first brightness for each of lighting elements that are shown by circles in FIG. 1 to present information of the value of a parameter of the output level set by the corresponding filter control 11 by the presence or absence and the style of the lighting.

The fader operation section 20 includes fader controls 21, fader channel indicators 22, group setting controls 23, and group display portions 24. FIG. 1 shows an example in which five sets of these components are provided.

The fader control 21, which is a slide-type control, is a setting control for setting the parameter of the input level or the output level of a channel allocated thereto.

The fader channel indicator 22 is an indicator including an LCD for displaying a channel for which the level is set by the fader control 21. For example, the fader channel indicator 22 on the most left side in FIG. 1 shows that the corresponding fader control 21 is a control for setting the input level of a first input ch.

The group setting control 23 is a setting control for selecting what group or no group the corresponding fader is made to belong to and is designed such that every time the group setting control 23 is pressed, the parameter indicating the group to which the fader will belong changes in sequence and cycles like the group 1→2→3→no→1.

The group display portion 24 is a display including, similarly to the filter value display portion 13, an LED for each frame to present information of the value of a parameter set by the corresponding group setting control 23 by the presence or absence and the style of the lighting of the LED.

Note that no display portion is provided that presents the information of the value of the parameter set by the fader control 21 in the mixer, and it is not always necessary to provide such a display for every setting control. As a matter of course, a display portion corresponding to the fader control 21 may be provided.

The group operation section 30 includes group fader controls 31, group indicators 32, group ON/OFF controls 33, and group ON/OFF display portions 34. FIG. 1 shows an example in which three sets of these components are provided.

The group fader control 31, which is a slide-type control, is a setting control for changing, when a group is effective, the values of parameters set by all the faders belonging to the group all at once by the same amount. When the group is in effective, the group fader 31 does not particularly participate in setting, and therefore the value of the parameter of the fader is set only by the fader control 21 in the fader operation section 20.

The group indicator 32 is an indicator including an LCD, for displaying a group for which the level is set by the group fader control 31. For example, the group indicator 32 on the most left side in FIG. 1 shows that the corresponding group fader control 31 is a control for setting the values of the parameters of a first group.

The group ON/OFF control 33 is a setting control for setting a parameter of the corresponding group being effective/ineffective and is designed such that every the time group ON/OFF control 33 is pressed, a change is made between ON (effective) and OFF (ineffective) alternately.

The group ON/OFF display portion 34 is a display portion including, similarly to the filter value display portion 13, an LED to present information of the values of parameters set by the corresponding group ON/OFF control 33 by the presence or absence and the style of the lighting of the LED.

The scene recall operation section 40 includes scene selection switches 41 to 43 and a preview key 44.

This mixer stores a set of values of parameters to be reflected in signal processing by the DSP 116 as scene data in a scene memory being a memory. The scene selection switches 41 to 43 are switches for instructing recall of the scene data. The mixer stores here three kinds of, that is, first to third scene data, and is thus provided with corresponding three scene selection switches to instruct recall of them respectively. When one of the scene selection switches is pressed, the CPU 111 loads the corresponding scene data and makes setting so that the values of the parameters included in the scene data are reflected in the signal processing in the DSP 116. In this case, displays on the display portions 13, 24, and 34 are also changed in accordance with the values of the parameters. Note that it is also possible to store by a not-shown control, as the scene data, the values of the parameters set by a user operating controls.

The preview key 44 is a control for instructing a preview of the scene data. When the scene selection switch is pressed while the preview key is being pressed, the CPU 111 changes only the displays on the display portions 13, 24, and 34 in accordance with the values of the parameters relating to the loaded scene data without reflection of the scene data in the signal processing. Then, the operator can verify the contents of the scene data through the displays. Accordingly, it can be said that the preview key 44 is a control for accepting the selection whether or not the loaded values of the parameters are reflected in the signal processing.

The display panel 50, which is a display constituted of an LCD, is for displaying a screen for referring to, changing, saving, and so on the setting of the mixer, the operating state of the device, and so on. The parameters of the mixer include those set on the screen of the display panel 50 using not-shown controls, in addition to those set by operation of the above-described setting controls.

In the mixer having the above-described console, the invention is characterized by the style of displays on the display portions 13, 24, and 34, and therefore this point will be described next. Note that a simply mentioned "display portion" in the following description shall represent the display portion including the LEDs.

In the mixer, the display portion can be made to perform display of the value of the parameter in one of three display styles such as a normal display, a special display A, and a special display B.

First, the normal display is a display style in which a current (at the point of display) value of the parameter set by the corresponding control is simply displayed. When the value of the parameter is changed in accordance with the operation of the control, the value after the change is displayed in the normal display.

The special display A and special display B are display styles in which when the scene data is recalled, the value of the parameter relating to the recalled scene data (new set value) and the value of the parameter that is set at the time of recalling (old set value) are displayed to show the relation between the values. The special display A is a display style showing that the new set value and the old set value match with each other, and the special display B is a display style showing that they do not match with each other.

Figure 3A:
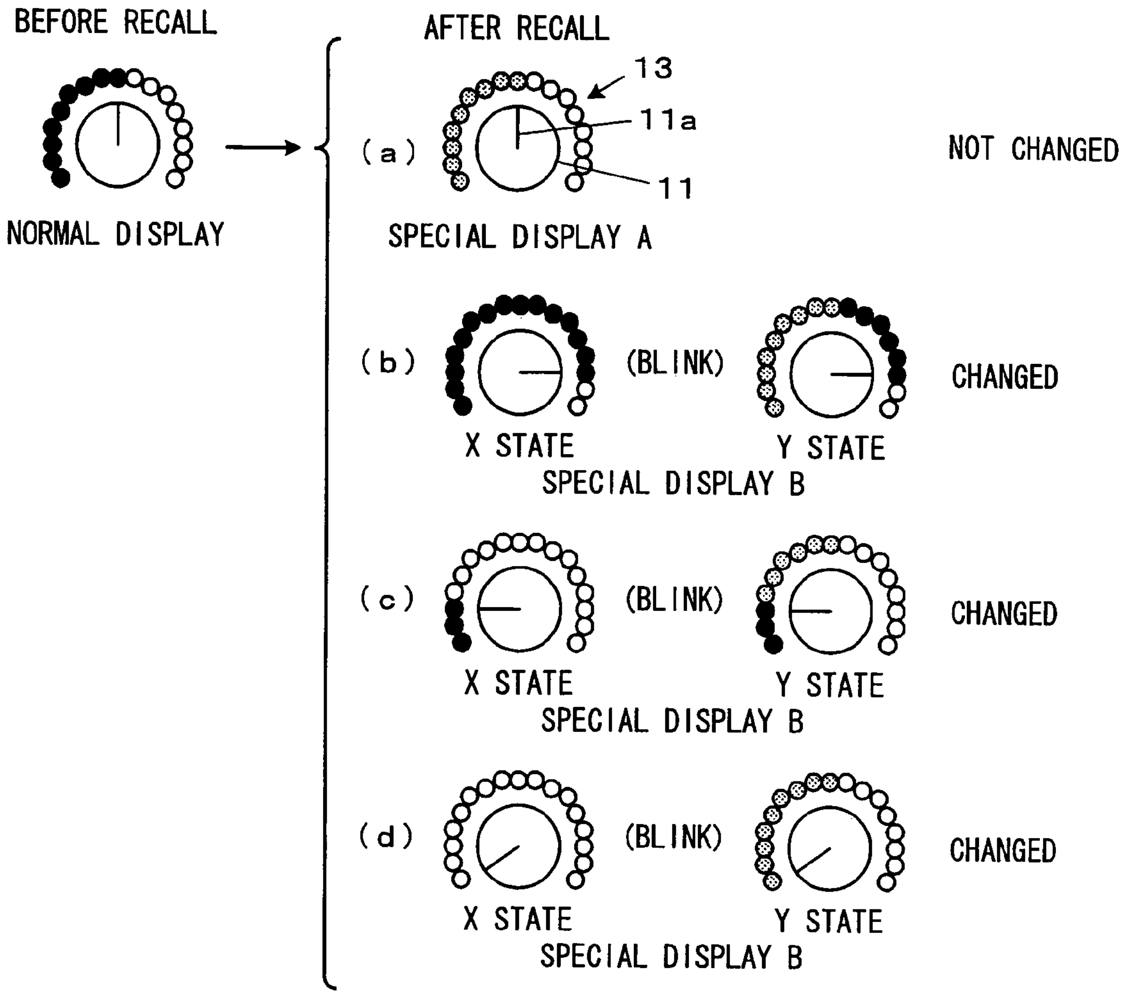
FIGS. 3A and 3B are views each showing a display example at a filter value display portion of a filter operation section, for explaining a display style at the display portion provided in the digital mixer.
Figure 3B:
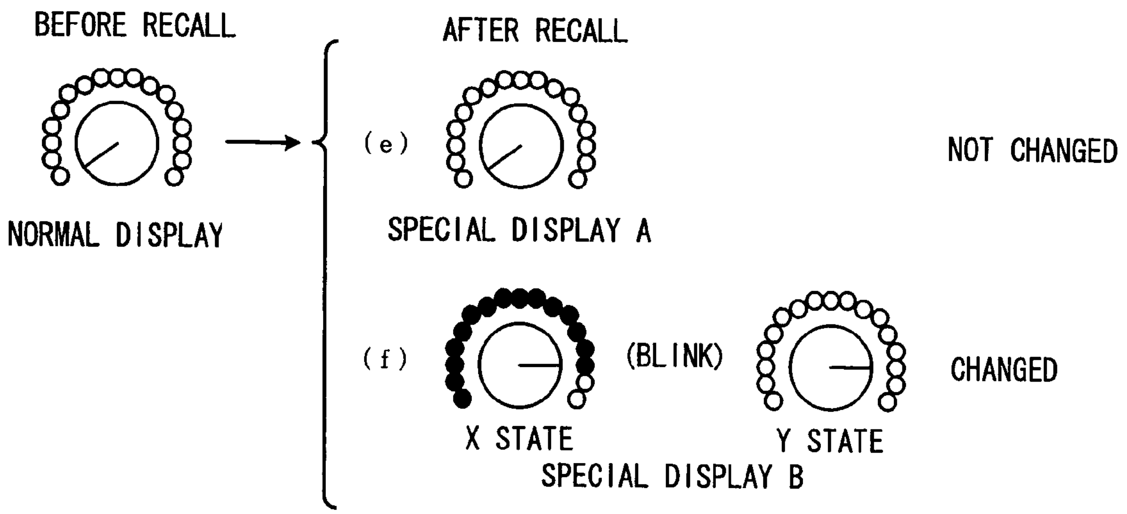
Figure 4A:
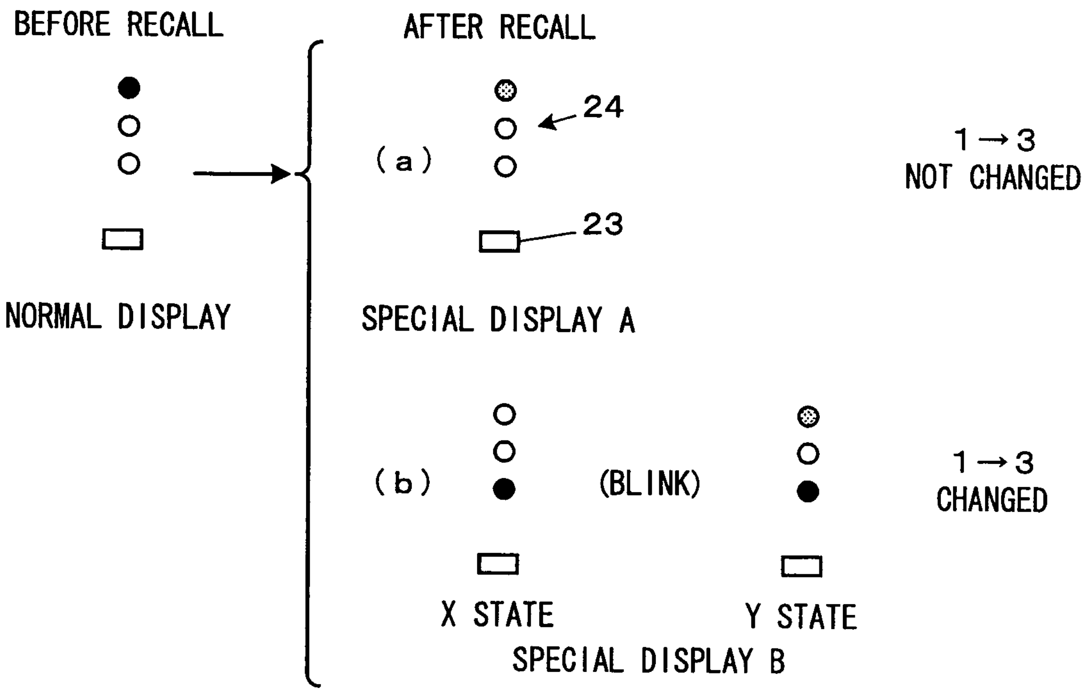
FIGS. 4A and 4B are similar views each showing a display example at a group display portion of a fader operation section.
Figure 4B:
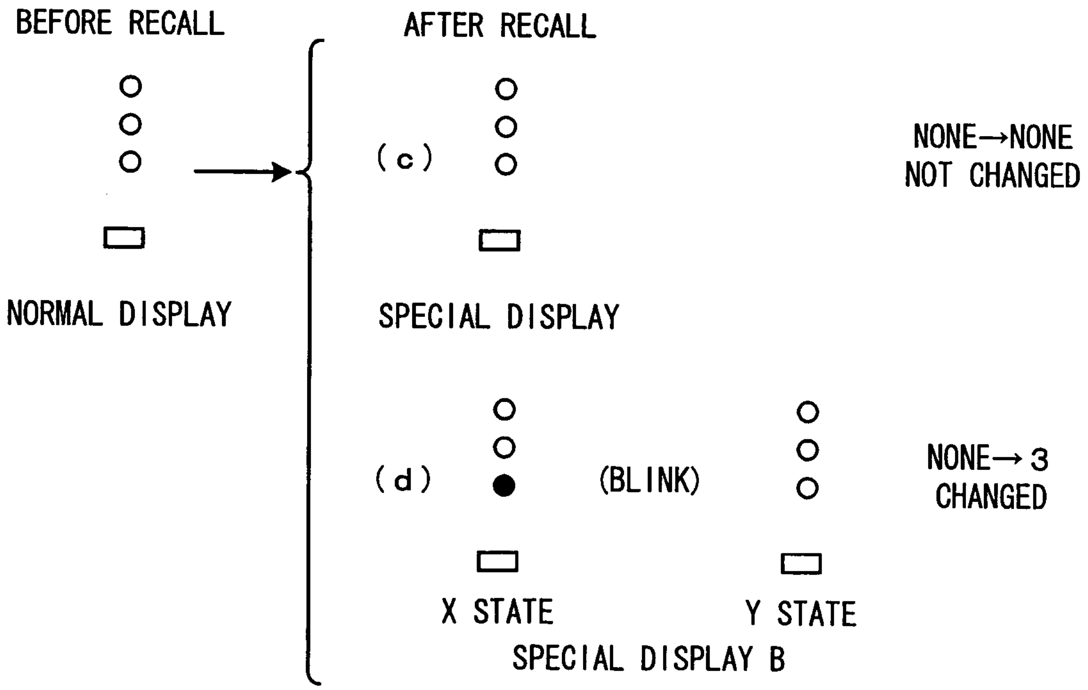
Figure 5A:
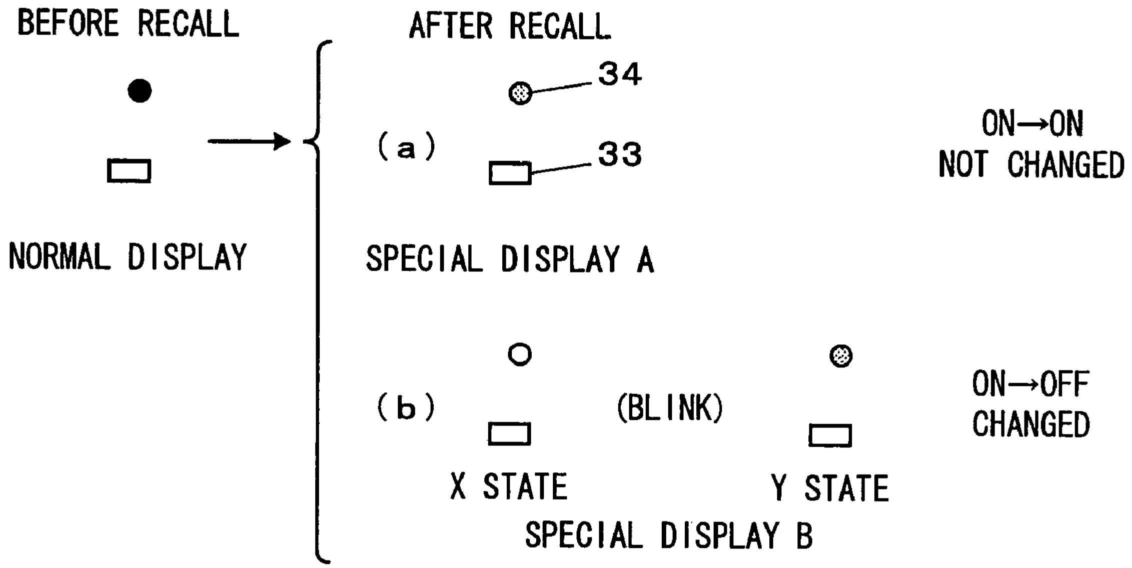
FIGS. 5A and 5B are similar views each showing a display example at a group ON/OFF display portion of a group operation section.
Figure 5B:
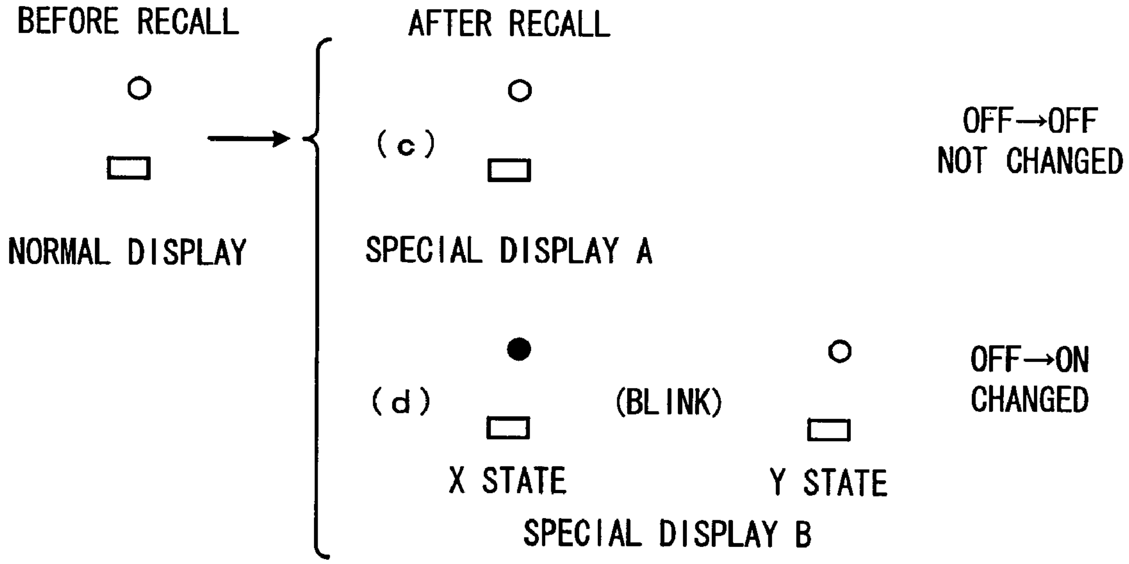

Specific examples of display in these display styles are shown in FIG. 3A to FIG. 5B. FIG. 3A and FIG. 3B show display examples at the filter value display portion 13 of the filter operation section 10, FIG. 4A and FIG. 4B show display examples at the group display portion 24 of the fader operation section 20, FIG. 5A and FIG. 5B show display examples at the group ON/OFF display portion 34 of the group operation section 30. In these drawings, the lighting elements are shown by black-filled circles, patterned circles, and hollow circles, which represent a state of the LED lighting up at a first brightness, a state lighting up at a second brightness, and a light-out state, respectively. The display at the first brightness is a first display style, and the display at the second brightness is a second display style that is less conspicuous than the first display style.

For example, when continuous values (including values that are actually discrete values but substantially continuous values) are displayed as in the filter value display portion 13, a plurality of lighting elements are arranged along the movable range of the control (pointer in particular) so that each of the lighting elements corresponds to a value of a parameter where the pointer of the control points the lighting element and near there. In the normal display, as shown in FIG. 3A, display is performed by turning on at the first brightness the LEDs starting from the lighting element corresponding to the minimum value to the lighting element corresponding to the current value. When the value of the parameter is the minimum value, the LEDs of all the lighting elements are turned off as shown in FIG. 3B. Here, the filter control 11 is operated clockwise to increase the value, the LEDs light up at the first brightness in sequence toward the right.

In the special display A, as shown by a reference symbol (a) in FIG. 3A and a reference symbol (e) in FIG. 3B, lighting points are the same as those in the normal display, but the LEDs are turned on at the second brightness.

Besides, in the special display B, a change is made between an X state and a Y state at a predetermined timing to perform blink display in the two states. The X state is a state displaying only the new set value in the above-described normal display, but the state Y is displayed in different methods depending on the magnitude relation between the new set value and the old set value.

More specifically, when the new set value is larger than the old set value as shown by a reference symbol (b) in FIG. 3A, the LEDs from the lighting element corresponding to the minimum value to the lighting element corresponding to the old set value are turned on at the second brightness to thereby display the old set value, and the LEDs therefrom up to the lighting element corresponding to the new set value are turned on at the first brightness to thereby display the new set value. Conversely, when the old set value is larger than the new set value as shown by a reference symbol (c), the LEDs from the lighting element corresponding to the minimum value to the lighting element corresponding to the new set value are turned on at the first brightness to thereby display the new set value, and the LEDs therefrom up to the lighting element corresponding to the old set value are turned on at the second brightness to thereby display the old set value. However, both cases are the same in that the old set value is displayed by a string of the lighting elements that are turned on at the second brightness and the new set value is displayed by a string of the lighting elements that are turned on at the first brightness.

Besides, when the new set value is the minimum value, only the old set value is displayed as in the special display A as shown by a reference symbol (d), and conversely, when the old set value is the minimum value, the LEDs of all the lighting elements of the display portion are turned off as shown by a reference symbol (f) in FIG. 3B.

In the special display B that is performed when the old set value and the new set value do not match with each other, it is desirable to display both the old and new set values to make the amount of change therebetween recognizable. The state Y is a display for the recognition but can be confused with the special display A when the new set value is the minimum value, and therefore the state X is also provided and made to blink in order to avoid this confusion. Accordingly, display may be performed only in the state Y in the case where such a situation does not occur. However, the blinking state provides an effect of easily attracting attention to a part where the value of the parameter is changed. It should be noted that in the case shown by the reference symbol (f) in FIG. 3B, if the state Y is displayed under the same rule as that in the cases shown by (b) and (c) in FIG. 3A, resulting in the same display as the state X, the difference of the state X from the special display A can be recognized, but the state X in this case is also made to blink as in the other cases and therefore all the LEDs are irregularly turned off in the state Y.

It should be noted that the examples in which the controls are rotated to the positions corresponding to the values of the recalled parameters are shown at a column AFTER RECALL in FIG. 3A and FIG. 3B, but such rotation is not essential. When the control is not rotated, the position of the control is different from the display contents, but there is no problem at all on setting of the parameter and display of the value thereof.

Next, when one value of a plurality of discrete values is displayed as in the group display portion 24, the lighting elements are arranged to correspond to possible values, respectively. Then, in the normal display, only the LED of the lighting element corresponding to the value of a parameter is turned on at the first brightness, as shown in FIG. 4A, to thereby perform display. Here, three lighting elements are provided which are arranged to correspond to a first, a second, and a third group, respectively, from the upper side. Besides, when a fader has no group (value) to belong to, all the LEDs are turned off as shown in FIG. 4B.

In the special display A, as in the cases of FIG. 3A and FIG. 3B, the same LED of the lighting element as that in the normal display is turned on at the second brightness as shown by a reference symbol (a) in FIG. 4A.

It is also similar to the cases of FIG. 3A and FIG. 3B that a change is made between an X state and a Y state at a predetermined timing in the special display B to perform blink display in the two states. However, since there is no magnitude relation between the values of the parameter here, the LED of the lighting element corresponding to the new set value is turned on at the first brightness, and the LED of the lighting element corresponding to the old set value is turned on at the second brightness in the state Y. However, when there is no lighting element corresponding to the old set value, all the LEDs of the display portion are turned off in the state Y as in the case shown by (f) in FIG. 3B.

Besides, when the value of a parameter that is a binary value is displayed as in the group ON/OFF display portion 34, the lighting element is turned on at the first brightness for ON and is turned off for OFF, as shown in FIG. 5A and FIG. 5B, to thereby perform display in the case of the normal display.

In such a display portion, there are only four combinations of the old set value and the new set value at the time of recalling the scene data as shown in FIG. 5A and FIG. 5B, but the principles of display control are the same as those shown in FIG. 4A and FIG. 4B. As a result, display styles in the special display A and the special display B in each case are those shown by reference symbols (a) to (d) in FIG. 5A and FIG. 5B.

Note that it is also adoptable to appropriately combine the above three examples to enable display of the value of a parameter that can take on a value other than the above values.

In this digital mixer, it is possible that the display portion is made to perform display in the above-described styles so that when the control is operated to change the value of a parameter, the current value in accordance with the operation can be displayed, while when the stored scene data is loaded, part of the value of a parameter that is changed from the value at the time of the loading and part thereof not changed can be easily distinguished. Further, for the changed part, it is possible to recognize the change in the value of the parameter between before and after the loading.

Furthermore, the LEDs for the part not changed in the value of the parameter is turned on at the second brightness that is lower than the first brightness, thus making it possible to make this part relatively less conspicuous without a reduction in the amount of information and emphasize the part changed in the value.

It should be noted that it is not so preferable to perform a special display for a long time after the loading of the scene data, and therefore when the control is manually operated after the loading, the display style of the display portion corresponding to the control shall be returned to the normal display.

Figure 6:
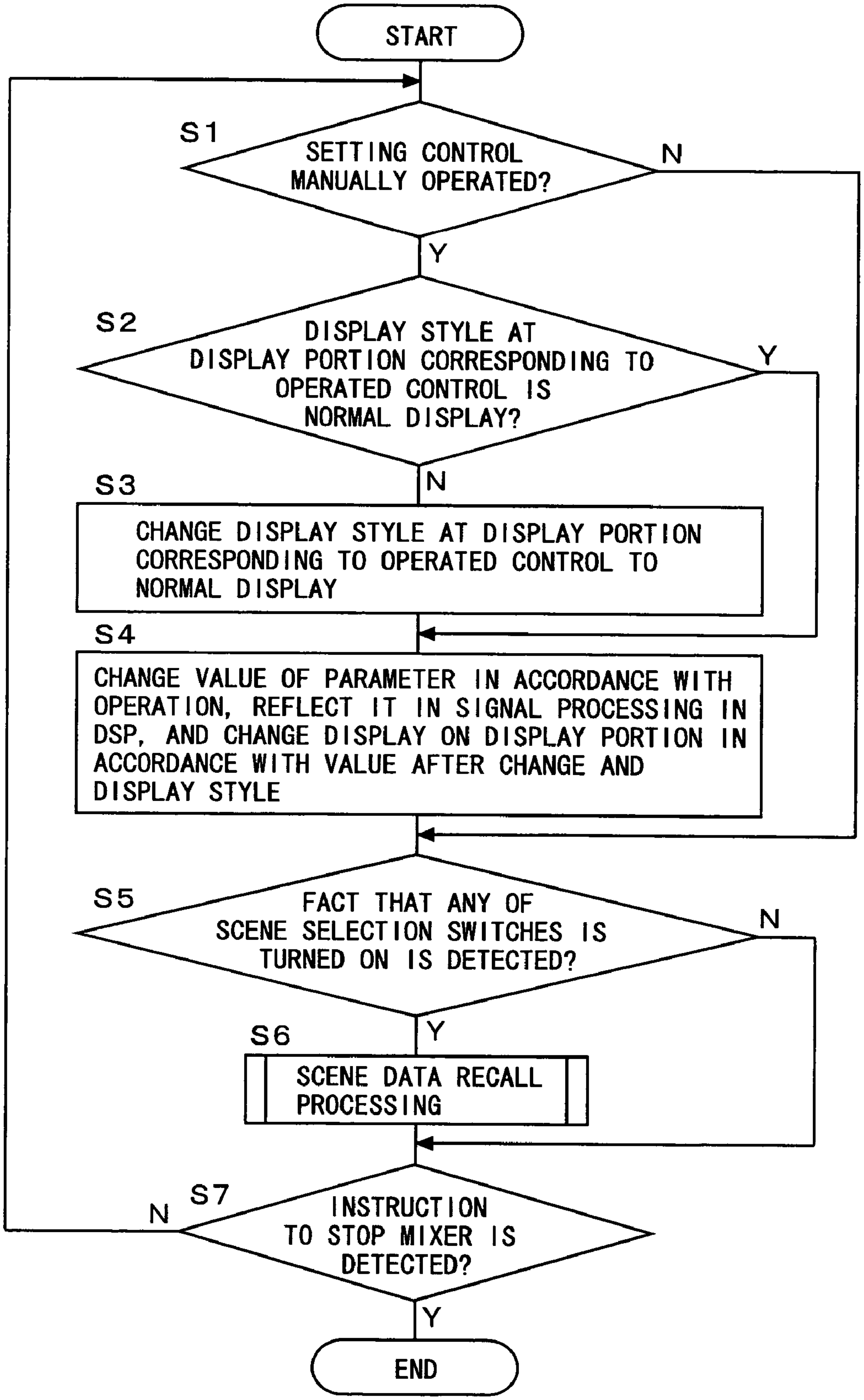
FIG. 6 is a flowchart showing a characteristic part of processing relating to display in the digital mixer shown in FIG. 2 and a change between display styles thereof.

Next, processing related to the above-described display and change between the styles thereof will be described. FIG. 6 is a flowchart showing the processing, but the flowchart shows a characteristic part of the processing related to the embodiment extracted from processing related to detection of the operation in the mixer, setting of parameters, display, and so on. The illustration and description of processing other than this part are omitted.

In this mixer, upon completion of a predetermined initialization after power-on, the CPU 111 executes a predetermined control program that is stored in the ROM 112 to thereby start the processing shown in the flowchart of FIG. 6. First, in Step S1, the operation contents of the control is detected based on a signal from the detection circuit 115. Then, when a manual operation of any of the setting controls is detected, the flow proceeds to Step S2.

Figure 8:
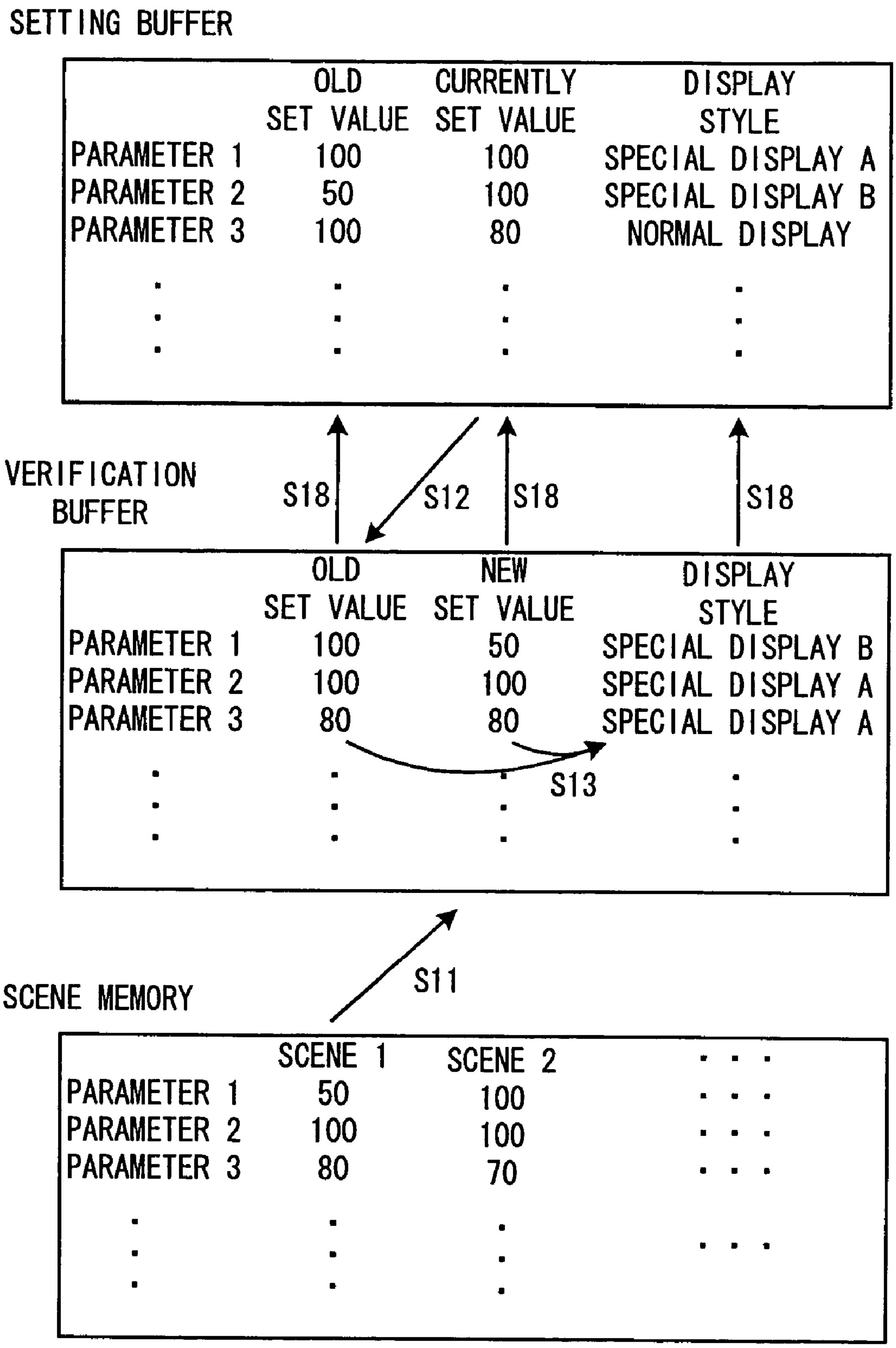
FIG. 8 is a view for explaining storage forms and processing contents in a setting buffer, a verification buffer, and a scene memory.

In Step S2, it is judged whether or not the display style at the display portion corresponding to the operated setting control is the normal display. In this mixer, the set values of each parameter are stored in the setting buffer provided in the RAM 113 as shown in FIG. 8. More specifically, in addition to the current set value that is the value of a parameter that is currently set, the display style at the display portion displaying the value and the old set value that is used for performance of the special displays are also stored in correspondence with each parameter. Therefore, referring to the display style of the parameter corresponding to the operated setting control (the parameter is to be set by the setting control at the time of processing), the display style at the display portion corresponding to the setting control is obtained.

When the result of judgment in Step S2 is not the normal display, the flow proceeds to Step S3, in which the display style at the display portion is changed to the normal display. This processing can be performed by changing the display style of the corresponding parameter in the setting buffer to the normal display.

In the subsequent Step S4, the current value of the parameter stored in the setting buffer is changed in accordance with the operation detected in Step S1 and then reflected in the signal processing in the DSP 116, and the display on the display portion is updated in accordance with the value after the change and the designated display style.

Subsequently to Step S4, the flow proceeds to Step S5 in which when the scene selection switch is turned on, the scene data recall processing is performed in Step S6, and then the flow proceeds to Step S7. If the switch is not turned on, the flow directly proceeds to Step S7.

Then, when an instruction to stop the mixer, that is, to turn off the power or reboot the mixer is detected in Step S7, the processing is finished, and otherwise the flow returns to Step S1 to repeat the processing.

It should be noted that, when the result of judgment in Step S2 is the normal display, the flow proceeds to Step S4 without executing the processing in Step S3, and when no manual operation of the setting control is detected in Step S1, the flow directly proceeds to Step S5.

Figure 7:
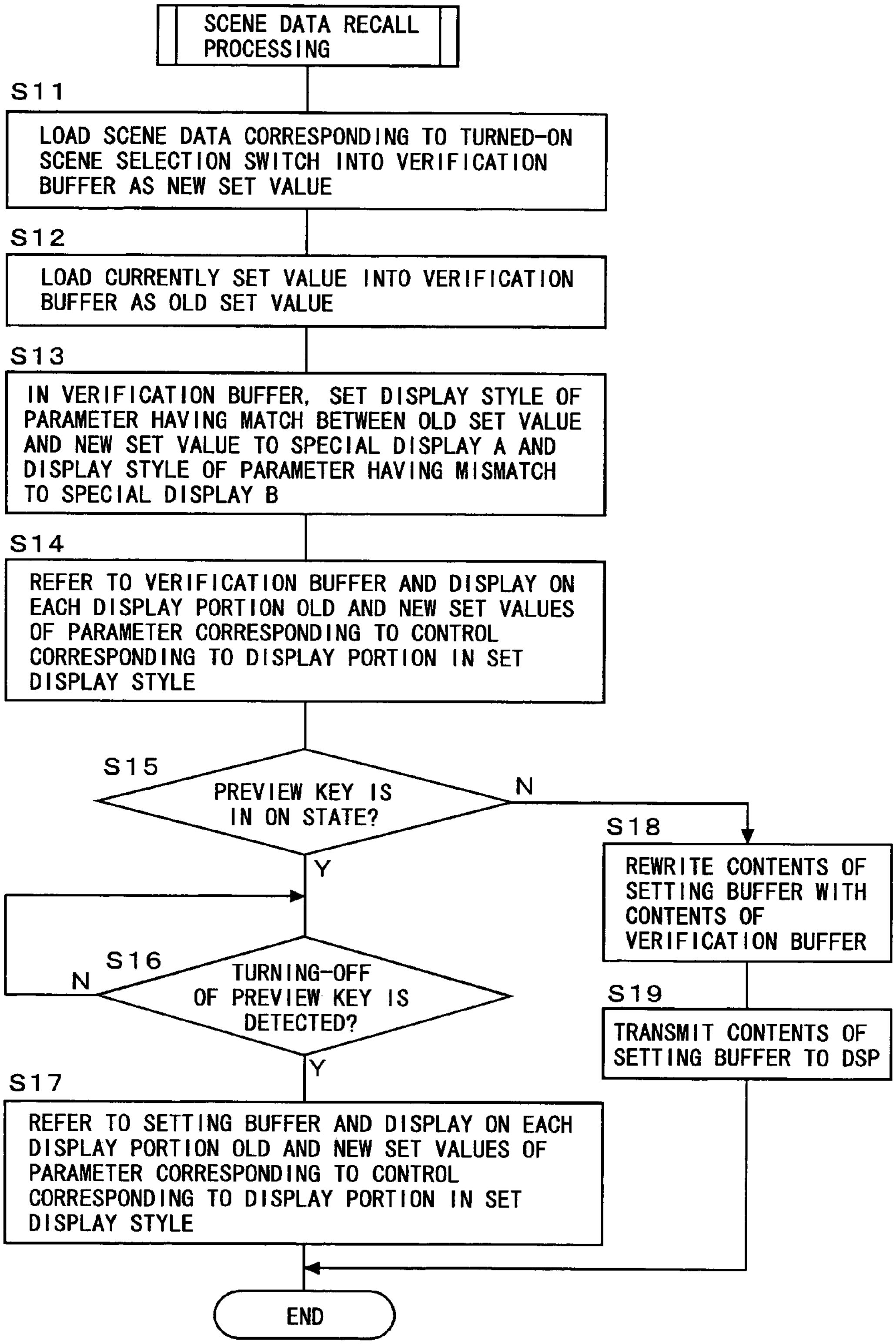
FIG. 7 is a flowchart showing scene data recall processing shown in FIG. 6.

The scene data recall processing shown in Step S6 in FIG. 6 is the processing in the flowchart of FIG. 7.

In this processing, first, in Steps S11 and S12, the scene data corresponding to the turned-on scene selection switch is loaded from the scene memory and stored in the verification buffer as the new set value, and the currently set value of the parameter is loaded from the setting buffer and stored in the verification buffer as the old set value as shown in FIG. 8. In the processing in Step S11, the CPU 111 functions as a loader.

The verification buffer here is a buffer into which the values of each parameter is stored in the same form as that in the setting buffer, and is provided to reflect the value of the parameter not in the signal processing in the DSP 116 but only on the display on the display portion so as to enable the operator to verify the contents of the scene data to be loaded.

In the subsequent Step S13, the old set value and the new set value are compared with each other for each parameter in the verification buffer so that the display style of the parameter is set to the special display A or the special display B in accordance with match/mismatch between the values. Then, in Step S14, referring and according to the old and new set values and the display style stored in the verification buffer, the display on each display portion is updated in the method shown in FIG. 3A to FIG. 5B. In this event, on each display portion, the old and new set values of the parameter corresponding to the control corresponding to the display portion are displayed. Since not all the set values of the parameters are displayed, the display style only needs to be determined for at least the parameters to be displayed, in Step S13.

The CPU 111 functions as a comparator in the above-described processing in Step S13, and functions as a display controller in the processing in Steps S13 and S14.

Then, when the preview key 44 is in an ON state in the subsequent Step S15, the flow proceeds to Step S16 in which the CPU 111 waits until the preview key 44 is turned off, and updates the display referring and according to the old and new set values and the display style stored in the setting buffer in Step S17. In other words, when the preview key 44 is pressed, the press is recognized as the setting of not reflecting the loaded scene data in the signal processing being accepted, so that the loaded scene data is used only for display, and upon release of the press, the display is returned to that before the loading, in which no change is made in setting. The CPU 111 functions as an instructor in these kinds of processing.

On the other hand, when the preview key 44 is not in the ON state in Step S15, the flow proceeds to Step S18 in which the contents of the setting buffer are rewritten with the contents of the verification buffer as shown in FIG. 8, and the new contents of the setting buffer are transmitted to the DSP 116 in Step S19 to be reflected in the signal processing, whereby the processing is completed. In this event, the new set value in the verification buffer is the current set value in the setting buffer. In other words, when the preview key 44 is not pressed, the state is recognized as the setting of reflecting the loaded scene data in the signal processing being accepted, so that the loaded scene data is reflected in the signal processing. Note that it is not particularly necessary to change the display here, but the display thereafter will be performed in accordance with the contents of the setting buffer. Alternatively, if the DSP 116 automatically refers to the contents of the setting buffer and performs processing based on the contents, the processing in Step S19 is unnecessary.

By performing the above-described processing, it is possible to perform the display that has been described above using FIG. 3A to FIG. 5B in accordance with the operation of each setting control and the instruction to recall the scene data, and to obtain the effects described therein. Further, the operator can easily verify the contents of the scene data, without affecting the signal processing, through the operation of the preview key 44.

The example in which the CPU 111 waits and performs no other operation during the press of the preview key 44 is described here, and it is also adoptable to make an arrangement such that the scene selection switches 41 to 43 are pressed one after another while the preview key 44 is being pressed to verify the contents of the scene data. Besides, it is also adoptable to make an arrangement such that when the preview key 44 is released prior to the scene selection switch, the contents of the loaded scene data can be reflected in the signal processing. According to the former modification, the operability in referring to the contents of a plurality of scene data is improved. According to the latter modification, the operability in reflecting the contents of the scene data in the setting after verification is improved.

Besides, as the condition for returning the special display to the normal display, the example in which when a control is manually operated, the display style of the display portion corresponding to the control is returned to the normal display has been described, but it is also adoptable to return the display style of all the display portions to the normal display upon operation. Other than the above, it is adoptable to make an arrangement such that the display style is returned to the normal display when a predetermined time has elapsed after the recall of the scene data, or when the user presses a specific switch, for example, a switch for changing the display to the normal display, after the recall of the scene data. It is also adoptable to combine these conditions to return the display style to the normal display when any one of them is satisfied. In this case, the contents of the setting data shall be changed and the display on each display portion shall be updated at the point of time when the condition is fulfilled.

Further, the display style of each display portion is not limited to those described using FIG. 3A to FIG. 5B, but any display style is acceptable as long as it is a display style in which when scene data is recalled, part of the value of a parameter that is different before and after the recall and part thereof not changed can be distinguished for recognition. For example, in the special display B described using FIG. 3A to FIG. 5B, display may be performed only in the state X (or the normal display). However, it is more preferable to employ a display style in which for the part of the value of the parameter that is changed, both the values before and after the recall can be recognized. As such a display style, it is preferable to employ a display style such that the values of the parameter before and after the recall are simultaneously presented in different display styles.

Furthermore, the example in which the LED capable of lighting up at brightness of two levels is used as the light source of the display portion and changed in brightness in accordance with the display contents has been described here, but it is also adoptable to use, for example, a red LED and a green LED in place of the aforementioned LED for a configuration in which each lighting element constituting the display portion can be selectively turned on in red or green so that the color of display is changed in place of brightness. Alternatively, it is also adoptable to use an LED capable of lighting up at brightness of only one level and change the rhythm or cycle of blink in place of brightness. However, the configuration in which the brightness of lighting is changed can make the display easier to view with the lighting element in a simpler configuration.

Besides, the example in which the invention is applied to the digital mixer has been described in the above embodiment, but the invention is not limited to this and is applicable to other audio signal processing devices such as a synthesizer and so on.

Further, the program for making the components including the CPU 111 realize the above-described functions is stored in the ROM 112 and so on in advance, and the same effect can be obtained also by providing the program recorded on a non-volatile memory such as a CD-ROM or a flexible disc and making the CPU 111 load for execution the program from the memory to the RAM 113, or by making the CPU 111 download for execution from an external device including a recording medium recording the program thereon or an external device storing the program in a memory such as a hard disc drive (HDD).

As has been described, with the audio signal processing device of the invention, when scene data stored therein is loaded, the display style of a display portion is made different between part of the value of a parameter that is changed from the value at the time of the loading and part thereof not changed, these parts can be easily distinguished.

Further, with the program of the invention, it is possible to make a computer control the audio signal processing device so as to realize the above-described characteristics of the audio signal processing device and obtain the same effect.

What is claimed is:

1. An audio signal processing device which processes audio signals and outputs the audio signals, comprising:

controls for setting values of parameters of the signal processing;

a display for presenting a set value of the parameter, the display being a display for presenting continuous values;

a memory for storing a value of the parameter;

a loader for loading the value of the parameter stored in said memory; and a display controller for making said display present the loaded value of the parameter and a value of the parameter set at a time of the loading when said loader loads the value of the parameter, such that a common display simultaneously presents the loaded value and the value set at the time of the loading in different display styles, wherein said display is made to present the value of the parameter set at the time of the loading and the loaded value of the parameter such that an overlapped part and a different part as related to a range from a common reference point to the value of the parameter set at the time of the loading and a range from the common reference point to the loaded value of the parameter are displayed in different display styles.

2. An audio signal processing device according to claim 1, wherein said display is made to present the overlapped part and the different part using each of a first display style and a second display style that is less conspicuous than the first display style.

3. An audio signal processing device according to claim 2, wherein when the loaded value of the parameter is larger than the value of the parameter set at the time of the loading, said display is made to present the overlapped part in the second display style and the different part in the first display style.

4. An audio signal processing device according to claim 2, wherein when the loaded value of the parameter is smaller than the value of the parameter set at the time of the loading, said display is made to present the overlapped part in the first display style and the different part in the second display style.

* * * * *